Aug. 15, 1972

E. KATZ ET AL 3,684,574

METHOD OF PRODUCING SWEET SYRUP BY RESIN
ISOMERIZATION OF DEXTROSE SYRUP
Filed April 20, 1970

INVENTORS:
EDWARD KATZ
IRVING EHRENTHAL
BARRETT L. SCALLET

BY *Gravely, Lieder & Woodruff*
ATTORNEYS 3,684,574
METHOD OF PRODUCING SWEET SYRUP BY RESIN ISOMERIZATION OF DEXTROSE SYRUP
Edward Katz, St. Louis, Irving Ehrenthal, University City, and Barrett L. Scallet, Clayton, Mo., assignors to Anheuser-Busch, Incorporated, St. Louis, Mo.
Filed Apr. 20, 1970, Ser. No. 29,838
Int. Cl. C13k 9/00
U.S. Cl. 127—46 A                    13 Claims

ABSTRACT OF THE DISCLOSURE

A line of fructose-containing, water white, ash-free, high DE syrups is made by resin isomerization. The process involves isomerization in equipment consisting of cation-anion exchange resins arranged in a loop. The high dextrose (95%) feed is first passed through a strong base anion resin column and then passed through a strong acid cation column, or the strong acid cation can be first. The output from the acid column is recirculated through the strong base column in a loop arrangement and the procedure is repeated until the desired degree of isomerization is achieved.

BACKGROUND OF THE INVENTION

There are several methods of isomerizing syrups to convert a portion of the dextrose to fructose. These include those described in Cantor 2,354,664; Scallet et al. 3,285,776 and 3,305,395; Langlois 2,746,889 and Tsao 3,432,395. These processes all require difficult purification steps for removal of impurities such as color, ash, and odor. Processes are known which are designed to alleviate some of these problems. These include the patent to Scallet et al. 3,383,245.

INTRODUCTION TO THE INVENTION

This invention relates to a process for producing a line of fructose-containing, water white, ash-free, high DE syrups.

The formation of fructose by a strong base anion resin technique is normally accompanied by some degradation products, some color bodies and traces of off-odors and off-flavors resulting from the isomerization resin. The process employed in this invention eliminates these objectionable odors as well as removing color bodies and degradation products. The resulting product is a high purity, low ash, colorless fructose-containing syrup.

The method used to produce the foregoing product is as follows:

Starch is hydrolyzed by conventional means and then enzyme-converted to produce a 95+ DE liquor high in dextrose. Other types of high dextrose feed may be used if desired. The terms dextrose and glucose are used interchangeably in this specification. The liquor is then purified by conventional methods and preferably, but not necessarily, ion exchanged to yield a water white, low ash 95+ DE liquor. This liquor is the raw material for the isomerization step.

A column containing a strong base anion macroreticular resin in the OH⁻ form is used for the isomerization. High DE ion exchanged feed liquor in the 20–60% DSB range is charged into a retaining vessel at a volume range of 2–12 volumes 40% DSB liquor per bed volume of strong base anion resin.

Another resin column which contains a strong acid cation resin is set up to contain 1 bed volume resin per 1–50 bed volumes 40% DSB isomerized feed liquor. The reaction temperature of the system should be between ambient and 150° F. Presently available strong base resins are not stable above this temperature in the hydroxyl form as used in this process. The isomerization is conducted in an arrangement in which the strong base anion resin column is connected in series to the strong acid cation column in a loop type configuration. Feed liquor is circulated through the loop at 0.01–30 bed volumes anion resin basis/min. until the proper fructose level is achieved.

At the end of the isomerizataion a typical analysis range would be 94–97 DE and 20–35% ketose. Exact specifications are determined by specific isomerization conditions.

The isomerized product made from a 95+ DE liquor can now be blended with another syrup, for example a 50 DE high maltose liquor (preferably ion exchanged) to yield a blend containing 10–17% fructose, 68–80 DE and 37–45% dextrose.

The subject blend liquor then may be carbon treated, filtered and concentrated to produce a water white supersweet non-crystallizing fructose containing syrup.

SUMMARY OF THE INVENTION

This invention relates to a method of making high purity, low ash, fructose containing syrups by a continuous loop macroreticular type resin isomerizataion and purification step and to the products produced by said process.

DETAILED DESCRIPTION

Figure 1:
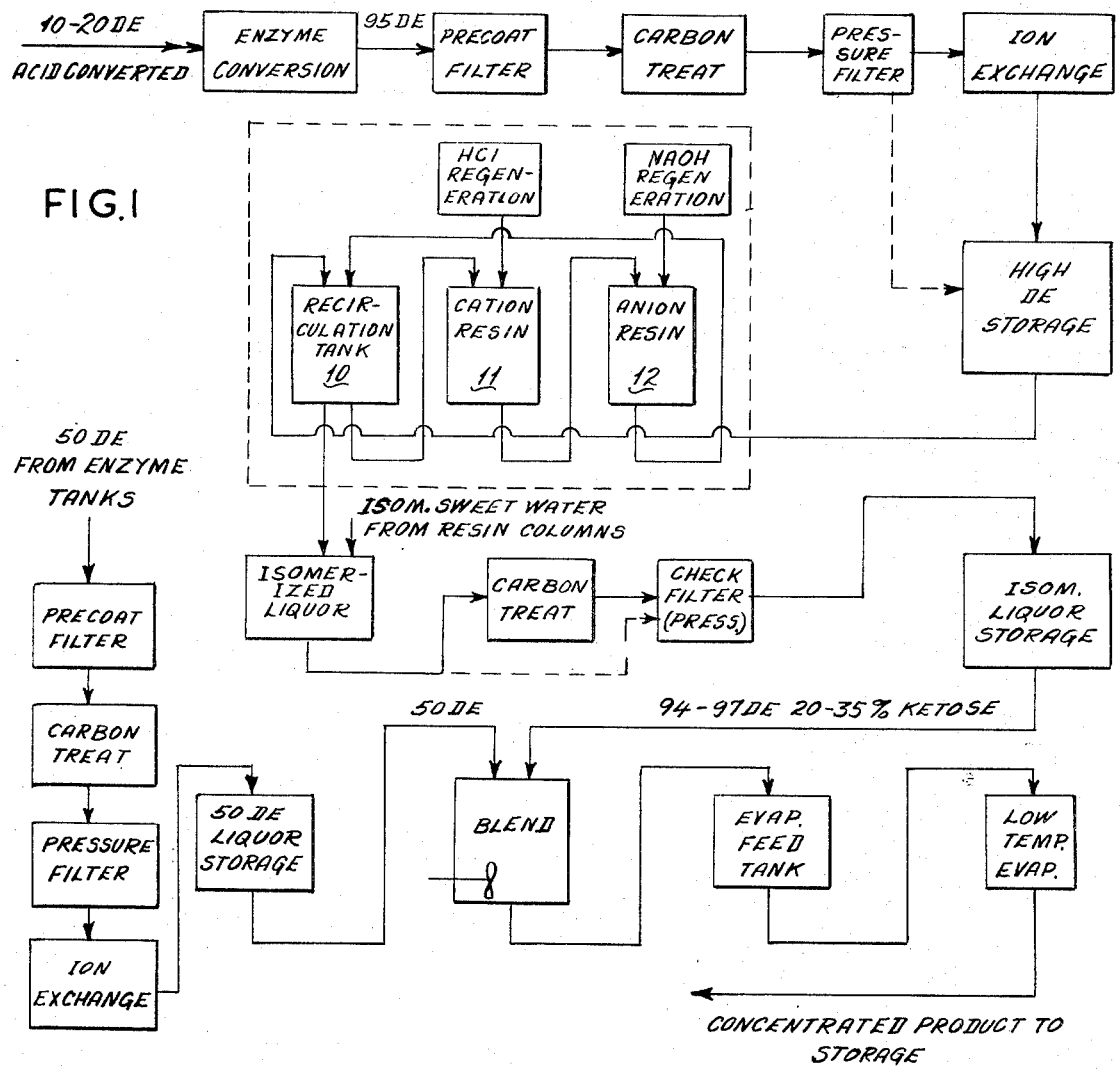
FIG. 1 is a flow diagram of an overall process for producing a syrup according to this invention.

FIG. 1 shows a schematic flow diagram of the invention.

Initially starch is acid hydrolyzed to about 10–20 DE (dextrose equivalent) by conventional means and then is enzyme converted (by conventional procedures) to produce a 95+ DE liquor, preferably 98+ DE with 95% + dextrose. The specific process illustrated uses a 98 DE liquor. The liquor is then purified by conventional methods and ion exchanged to yield a water white, low ash 98 DE liquor. This liquor is the raw material for the isomerization step.

The specific purification is a precoat filter for removal of muds, followed by a carbon treatment for color removal. The syrup then is pressure filtered for removal of carbon and all solids followed by an ion exchange treatment to remove ash. The ion exchange consists of a strong acid cation resin (C–25, IR200, or Dowex 50) and weak base anion resin (A–6). Thus the feed to the loop isomerization is water white, of low ash (less than 0.05%) and high DE and dextrose. The specific preferred feed is 98+ DE and 95%+ dextrose.

The feed goes to a recirculation tank 10 where it is pumped through the isomerization loop. It first passes through the cation resin column 11.

The column 11 contains a strong acid cation resin, such as, Duolite C–3 H⁺ form (methylene sulfonic functional group in phenolic matrix). The column 11 contains 1 bed volume resin per 1–50 bed volumes 40% DSB (dry solids basis) isomerized feed liquor and preferably contains 1 bed volume resin for each 10–20 bed volumes of feed.

The second resin column 12 contains a strong base anion macroreticular resin (styrene divinyl benzene containing quaternary ammonium groups) in the OH⁻ form, such as Rohm & Haas IRA 900. A macroreticular resin is preferred because of its porosity and superior cycle life properties. The feed liquor has about 20–60% DSB and preferably 40% DSB. The feed volume is 2–12 bed volumes 40% DSB liquor per volume of strong base anion resin in the column 12. A range of 4–8 bed volumes is preferred.

The macroreticular resins preferred in the practice of this invention are described in British Pats. Nos. 932,125 and 932,126. The macroreticular resins have pores on passages through which the syrup can pass to get at the exchange sites on the interior of each bead of resin. The surface area of the macroreticular resins can vary between 20 and 70 or even higher square meters/gm. of dry resin. The porosity is from 0.4 to 0.6 or greater ml./ ml. of resin. The average pore diameter is 600 to 1400 or more angstroms.

Each batch of feed is recirculated through the loop until the desired degree of isomerization is obtained. This may involve repeated passes through the tank 10 and the columns 11 and 12 and may take 4 to 24 hours. After isomerization of each batch, the columns 11 and 12 are regenerated as hereinafter described before another batch of syrup is isomerized.

The reaction temperature of the system should be between ambient and 150° F. with a preferred temperature range of 110°–140° F.

At the end of the isomerization a typical analysis range would be 94–97 DE and 20–35% ketoses. These ketoses consist predominantly of fructose, but include small amounts of psicose, as was shown in U.S. Pat. No. 3,383,245.

The rate of circulation of the feed liquor through the system is about 0.01 to about 30 bed volumes anion resin basis/min. The preferred rate is about 0.05 to about 1.0 bed volumes/min. The amount of fructose obtained depends on a number of factors, such as resin contact time, temperature, solids level, type of resin, method of resin regeneration, etc.

Figure 2:
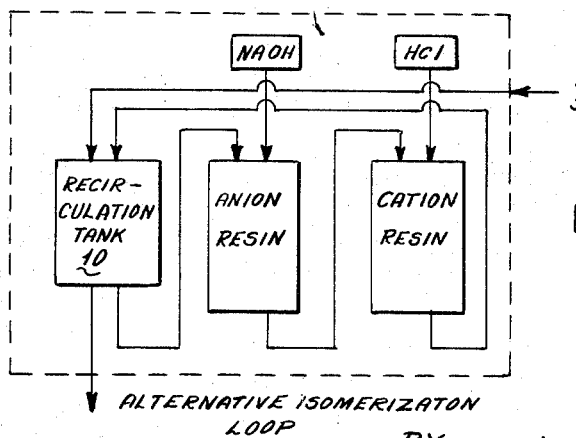
FIG. 2 is a flow diagram of an alternative isomerization loop.

The cation and anion resin columns can be interchanged so that the feed enters the strong base column, before it enters the strong acid column, if ion exchanged feed is used (FIG. 2). If the feed is not ion exchanged, it is preferred to pass the material through the strong acid column first to prevent formation of excess color.

The anion resin is regenerated by using a strong base reagent such as NaOH solution. The acid resin is regenerated by using a strong acid such as sulfuric or hydrochloric. The regeneration is done after every batch has completed its passes through the column.

As each batch is removed from the isomerization loop, the columns 11 and 12 are regenerated. The column 12 may be given a pre-wash with approximately 1 to 2 N acid to strip color bodies and degradation products from hydroxyl sites in the resin. The spent acid from the regenerated cation resin may be used as a part of the pre-wash acid used to regenerate the anion column 12. After the initial acid treatment the anion column is rinsed and given its base treatment to regenerate the isomerizing hydroxyl sites in the resin to prepare the resin for the next batch of syrup.

The product from the loop isomerization has about 94–97 DE and 20–35% ketose. The small loss in DE during isomerization is more than compensated for by the increased sweetness of the fructose produced. This product may be carbon treated and pressure filtered before blending.

The loop isomerization method produces large amounts of ketoses without much degradation. The reasons for this are not known with certainty. However, it appears that the isomerization is never allowed to take place long enough in any one pass to permit substantial amounts of degradation products to accumulate.

The net result is that the isomerized syrup issuing from the loop system of this invention has greater color stability than does a corresponding syrup made entirely by isomerization over a single strong-base resin column. This is shown in Table I, which indicates that, although the syrups coming out of the two types of systems have about the same color, on heat punishment in the steam bath, the loop-isomerized syrup is significantly less highly colored. The heat test is a standard test for corn syrups and simulates aging. Run No. 1 is of a loop isomerized material made according to the present invention and Run No. 2 is entirely isomerized in an IRA 900 resin column with a final single pass through a C–3 resin column.

TABLE I—COLOR STABILITY STUDY

| | | | | Percent transmission at— | |
|---|---|---|---|---|---|
| Run No. | DSB | pH | Ketose | 450 millimicrons | 450 millimicrons after 1 hr. on steam bath |
| 1 | 35.2 | 5.3 | 26.3 | 98.0 | 94.5 |
| 2 | 35.2 | 5.3 | 28.3 | 97.0 | 89.0 |

NOTE: The above colors were read on the Bausch & Lomb Spectronic 2 Colorimeter using standard (6" x ¾" dia.) size test tubes.

The use of the strong acid columns is important because it removes odors (amine odors mainly) and off-flavors which appear to have originated through partial breakdown of the strong base resin. It also removes any residual cations from the syrup which have gone through the preliminarly deionizing procedure if used.

In a preferred process, the isomerized product made from the 95+ DE feed liquor is blended with a 50 DE high maltose liquor (preferably ion exchanged) to yield a blend containing 10–17% fructose, 68–80 DE and 37–45% dextrose.

The liquor to be blended is precoat filtered, carbon treated if necessary, pressure filtered and ion exchanged before blending. The blended liquor is concentrated to produce a water white, supersweet, non-crystallizing, fructose-containing syrup.

The reason that the isomerized product is blended is to reduce the dextrose content to below about 45%. Higher amounts of dextrose tend to crystallize upon standing, particularly in cool climates.

The isomerization can be employed with any glucose-containing liquor feeds to produce a fructose-containing syrup, but naturally the higher the glucose content the higher will be the ketose content in the finished syrup.

EXAMPLES

In each of the following examples there was produced a satisfactory water white, colorless, high fructose syrup. The detailed analysis of each syrup is given in Table II following the examples.

Example I

Conditions: Temp. of feed—125° F.
Resin columns:
    100 cc. IRA 900 (OH⁻ form)+20 cc. Duolite C–3 (H⁺ form) in series
    Flow rate—10 bed vol./min. anion resin basis
    Feed—400 cc. ion exchanged 99 DE liquor, 97% dextrose, 40% DSB

| Time (hrs.): | Percent ketose |
|---|---|
| 1 | 12.7 |
| 2 | 20.1 |
| 4 | 27.4 |
| 6 | 30.0 |
| 8 | 32.0 |
| 12 | 33.9 |
| 24 | 34.4 |

Example II

Conditions: Temp. of feed—125° F.
Resin columns:
    100 cc. IRA 900 (OH⁻ form)+30 cc. Duolite C–3 (H⁺ form) in series
    Flow rate—10 bed vol./min. anion resin basis
    Feed—600 cc. ion exchanged high 99 DE liquor, 97% dextrose, 40% DSB

| Time (hrs.): | Percent ketose |
|---|---|
| 1 | 9.2 |
| 2 | 14.5 |
| 4 | 22.6 |
| 6 | 24.7 |
| 8 | 27.5 |
| 12 | 27.6 |
| 24 | 28.4 |

Example III

Conditions: Temp. 140° F.
Resin columns:
  115 cc. IRA 900 (OH⁻ form)+31 cc. C-3 (H⁺ form)
  Flow rate—8.7 bed vol./min. anion resin basis
  Feed: 400 cc. non-ion exchanged high 99 DE liquor, 97% dextrose, 40% DSB

| Time (hrs.): | Percent ketose |
|---|---|
| 4.5 | 25.7 |
| 8.0 | 26.2 |
| 12.0 | 26.2 |
| 24.0 | 27.1 |

Example IV

Conditions: Temp. 125° F.
Resin columns:
  100 cc. IRA 900 (OH⁻ form)+30 cc. of C-20 (H⁺ form)
  Flow rate—10 bed vol./min. anion resin basis
  Feed—600 cc. ion exchanged 99 DE liquor, 97% dextrose, 40% DSB

| Time (hrs.): | Percent ketose |
|---|---|
| 1 | 6.5 |
| 2 | 13.2 |
| 4 | 17.7 |
| 8 | 22.4 |
| 12 | 24.4 |
| 24 | 26.0 |

Example V

Conditions: Temp. 125° F.
Resin columns:
  100 cc. IRA 900 (OH⁻ form), 33 cc. of C-20 (H⁺ form)
  Flow rate—10 bed vol./min. anion resin basis
  Feed—600 cc. ion exchanged 76 DE liquor, 60% dextrose, 40% DSB

| Time (hrs.): | Percent ketose |
|---|---|
| 1 | 7.3 |
| 2 | 11.7 |
| 4 | 14.9 |
| 6 | 16.1 |
| 8 | 17.5 |
| 12 | 17.4 |
| 24 | 18.2 |

Example VI

Conditions: Temp. 125° F.
Resin columns:
  IRA 900—5 gal. bed volume C-3, 1.5 gal. bed volume
  Feed volume 26.7 gal. 44.9% DSB (6 bed vol. 40% DSB equivalent)
  Feed rate—2.5 g.p.m. (0.5 bed vol./min.)
  Feed—99 DE ion-exchanged liquor
Isomerization results:

| Time (hrs.)— | Percent ketose |
|---|---|
| 5 | 18.6 |
| 16 | 31.4 |

Example VII

Conditions: Temp. 125° F.
Resin columns:
  100 cc. IRA 900 (OH⁻ form), 30 cc. Duolite (C-3 H⁺ form [loop])
  Flow rate—10 bed vol./min.
  Feed liquor—13.18 cc. 20% DSB 99 DE ion exchanged (equiv. to 600 cc. 40% DSB)

Example VIII

Conditions: Temp. 125° F.
Resin columns:
  100 cc. IRA 900 (OH⁻ form), 30 cc. Duolite C-3 (H⁺ form [loop])
  Flow rate—3.5 bed vol./min.
  Feed liquor—366 cc. 60% DSB 99 DE ion exchanged (equiv. to 600 cc. 40% DSB)

Example IX

Conditions: Temp. 100° F.
Resin columns:
  100 cc. IRA 900 (OH⁻ form), 30 cc. Duolite C-3 (H⁺ form) [loop]
  Flow rate—6.5 bed vol./min.
  Feed liquor—600 cc. 40% DSB 99 DE ion exchanged

TABLE II

| Example Run No. | Temp., °F. | Percent DE feed | Time, hrs. | Percent dextrose feed | Percent DSB | Percent ketose | Percent fructose | Percent dextrose | Percent DE | Percent psicose |
|---|---|---|---|---|---|---|---|---|---|---|
| 1 | 125 | 99 | 24 | 97 | 40 | 34.4 | 27.4 | | | 4.8 |
| 2 | 125 | 99 | 24 | 97 | 40 | 28.4 | | | | |
| 3 | 140 | 99 | 24 | 97 | 40 | 27.1 | 22.0 | | | 3.2 |
| 4 | 125 | 99 | 24 | 97 | 40 | 26.0 | | | | |
| 5 | 125 | 76 | 24 | 60 | 40 | 18.2 | 13.9 | | | 1.8 |
| 6 | 125 | 99 | 16 | 97 | 44.9 | 31.4 | | | | |
| 7 | 125 | 99 | 24 | 98.3 | 20 | 24.5 | 20.7 | 75 | 98.5 | |
| 8 | 125 | 99 | 24 | 98.3 | 60 | 27.6 | 23.6 | 67.5 | 96.9 | |
| 9 | 100 | 99 | 48 | 98.3 | 40 | 24.3 | 22.2 | 72 | 97.4 | |

What is claimed is:
1. A method of producing a substantially water clear low ash extra sweet syrup comprising the steps of:
    (a) feeding a syrup having a substantial proportion of dextrose into a resin isomerization loop, said loop comprising a strong base resin column in the hydroxide form and a strong acid resin column in the hydrogen form in series,
    (b) continuously circulating said syrup through the strong base resin column and the strong acid resin column one after the other in series, and
    (c) recovering a syrup having increased ketose and reduced dextrose content.
2. The method of claim 1 where the syrup is passed first through the strong acid resin and then through the strong base resin.

3. The method of claim 1 wherein the strong base resin column is of the macroreticular type.

4. The method of claim 1 wherein the feed is of DE greater than 95 and the dextrose content is greater than 90%.

5. The method of claim 1 wherein the temperature of the syrup in the isomerization loop is between about ambient and about 150° F.

6. The process of claim 1 wherein the feed to the isomerization loop is 2 to 12 volumes per volume of strong base resin.

7. The process of claim 1 wherein the acid resin is of the sulfonic acid type.

8. The process of claim 1 wherein the isomerized syrup contains 20-35% ketoses of which at least 15% are fructose.

9. The process of claim 1 wherein the input syrup is cation and anion ion exchanged prior to entering the isomerization loop.

10. The process of claim 1 wherein the isomerized syrup is blended with lower dextrose syrup to produce a high DE, substantially water clear non-crystallizing product having a dextrose content of below about 45%.

11. The process of claim 1 wherein the feed is of DE greater than 70 and the dextrose content is greater than 50%.

12. The process of claim 1 wherein the syrup resides in the isomerization loop for between 4 and 24 hours.

13. The process of claim 12 including the step of regenerating the macroreticular isomerization resin by treating said resin with a strong acid prior to treating it with a strong base.

References Cited

UNITED STATES PATENTS

| | | | |
|---|---|---|---|
| 2,746,889 | 5/1956 | Langlois | 127—46 A |
| 3,305,395 | 2/1967 | Scallet | 127—46 R |
| 3,475,216 | 10/1969 | Walon | 127—46 R |
| 2,911,329 | 11/1959 | Blann | 127—46 R |
| 2,892,737 | 6/1959 | Rohwer | 127—46 X |
| 3,285,776 | 11/1966 | Scallet | 127—46 R |
| 3,383,245 | 5/1968 | Scallet | 127—46 X |
| 3,558,355 | 1/1971 | Okazaki | 127—46 A |

MORRIS O. WOLK, Primary Examiner

S. MARANTZ, Assistant Examiner

U.S. Cl. X.R.

127—46 R; 260—209 R